(12) United States Patent
Yeo et al.

(10) Patent No.: US 11,777,649 B2
(45) Date of Patent: Oct. 3, 2023

(54) METHOD AND DEVICE FOR TRANSMITTING DATA IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Younsun Kim, Gyeonggi-do (KR); Sungjin Park, Incheon (KR); Jinyoung Oh, Seoul (KR)

(73) Assignee: Samsung Electronics Co., Ltd

( * ) Notice: Subject to any disclaimer, the term of this patent is extended or adjusted under 35 U.S.C. 154(b) by 75 days.

(21) Appl. No.: 17/409,382

(22) Filed: Aug. 23, 2021

(65) Prior Publication Data

US 2021/0385014 A1  Dec. 9, 2021

Related U.S. Application Data

(63) Continuation of application No. 16/346,696, filed as application No. PCT/KR2017/012080 on Oct. 30, 2017, now Pat. No. 11,101,928.

(30) Foreign Application Priority Data

Nov. 1, 2016  (KR) ........................ 10-2016-0144703

(51) Int. Cl.
*H04L 1/00*  (2006.01)
*H04L 5/00*  (2006.01)
(Continued)

(52) U.S. Cl.
CPC .......... *H04L 1/0063* (2013.01); *H04L 1/0061* (2013.01); *H04L 1/0083* (2013.01);
(Continued)

(58) Field of Classification Search
None
See application file for complete search history.

(56) References Cited

U.S. PATENT DOCUMENTS

| 2010/0239035 A1 | 9/2010 | Blankenship et al. |
| 2010/0303016 A1 | 12/2010 | Jin et al. |

(Continued)

FOREIGN PATENT DOCUMENTS

| CN | 104301077 | 1/2010 |
| CN | 101667900 | 3/2010 |

(Continued)

OTHER PUBLICATIONS

European Search Report dated Sep. 18, 2019 issued in counterpart application No. 17867698.7-1220, 6 pages.
(Continued)

*Primary Examiner* — Diane L Lo
(74) *Attorney, Agent, or Firm* — The Farrell Law Firm, P.C.

(57) ABSTRACT

Methods and devices in a wireless communication system are provided. Information on a number of code block group per transport block (TB) is received from a base station. Each code block group includes at least one code block. A TB and control information scheduling the TB are received from the base station. Code block groups for the TB are identified based on a number of code blocks for the TB and the information. The number of the code blocks for the TB being determined based on the control information. The TB is decoded based on the identified code block groups. Hybrid automatic repeat request (HARQ) feedback information is transmitted to the base station based on a result of the decoding.

12 Claims, 19 Drawing Sheets

(51) Int. Cl.
  *H04W 80/08* (2009.01)
  *H04W 84/04* (2009.01)
  *H04L 1/1812* (2023.01)
  *H04W 72/0446* (2023.01)
  *H04W 72/23* (2023.01)

(52) U.S. Cl.
  CPC .......... *H04L 1/1819* (2013.01); *H04L 5/0055* (2013.01); *H04L 5/0082* (2013.01); *H04W 72/0446* (2013.01); *H04W 72/23* (2023.01); *H04W 80/08* (2013.01); *H04W 84/04* (2013.01)

(56) References Cited

U.S. PATENT DOCUMENTS

| | | |
|---|---|---|
| 2011/0261775 A1 | 10/2011 | Kim et al. |
| 2012/0002657 A1 | 1/2012 | Seyama et al. |
| 2014/0161108 A1 | 6/2014 | Lohr et al. |
| 2016/0036578 A1 | 2/2016 | Malladi |
| 2016/0119948 A1* | 4/2016 | Damnjanovic ........... H04L 5/14 370/280 |
| 2016/0226643 A1 | 8/2016 | Mallik et al. |
| 2016/0233999 A1* | 8/2016 | Chendamarai Kannan ................. H04W 72/20 |
| 2017/0134129 A1 | 5/2017 | You et al. |
| 2017/0294990 A1 | 10/2017 | Xu et al. |
| 2018/0054800 A1 | 2/2018 | Yeo et al. |
| 2018/0070341 A1* | 3/2018 | Islam ................. H04W 72/044 |
| 2019/0020445 A1* | 1/2019 | Kim ..................... H04L 1/0057 |
| 2019/0191487 A1* | 6/2019 | Kwon ................... H04L 1/1819 |
| 2019/0335536 A1* | 10/2019 | Kwon ................... H04L 1/1864 |

FOREIGN PATENT DOCUMENTS

| | | |
|---|---|---|
| EP | 3 200 371 | 8/2017 |
| KR | 1020180021628 | 3/2018 |
| WO | WO 2016/045391 | 3/2016 |
| WO | WO 2016/099057 | 6/2016 |
| WO | WO 2016/126653 | 8/2016 |

OTHER PUBLICATIONS

PCT/ISA/210 Search Report issued on PCT/KR2017/012080 (pp. 7).
PCT/ISA/237 Written Opinion issued on PCT/KR2017/012080 (pp. 6).
Chinese Office Action dated Jun. 28, 2021 issued in counterpart application No. 201780068025.7, 17 pages.
Korean Office Action dated May 15, 2023 issued in counterpart application No. 10-2016-0144703, 10 pages.

* cited by examiner

METHOD AND DEVICE FOR TRANSMITTING DATA IN WIRELESS CELLULAR COMMUNICATION SYSTEM

PRIORITY

This application is a Continuation Application of U.S. application Ser. No. 16/346,696, filed in the U.S. Patent and Trademark Office on May 1, 2019, which is a National Phase Entry of PCT International Application No. PCT/KR2017/012080 which was filed on Oct. 30, 2017, and claims priority to Korean Patent Application No. 10-2016-0144703, which was filed on Nov. 1, 2016, the content of each of which is incorporated herein by reference.

FIELD

The present disclosure relates to a wireless communication system and, in particular, to a transmission method and device capable of splitting a transport block into one or more sub-transport blocks and splitting each sub-transport block into one or more code blocks, which are coded with one or more channel codes and transmitted.

BACKGROUND

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, data are transmitted by transport block (TB) in the wireless communication system, particularly the legacy LTE system. A TB is split into multiple code blocks (CBs), and channel coding is performed by CB. A retransmission following an initial transmission is performed by TB, which causes a problem in that decoding failure on one CB leads to the retransmission of the whole TB.

SUMMARY

The present invention aims to make a definition on a sub-transport block (sub-TB) for the case of requiring retransmission of part of a TB. The present invention also provides a method for allowing a receiver to determine whether a transmission succeeds or fails by adding a cyclic redundancy check (CRC) to a TB, sub-TB, and CB and a method for a base station to configure a CRC length. The sub-TB being defined in the present invention is a virtual concept, and it may be possible to consider only the CRC being actually added per virtual sub-TB.

In accordance with an aspect of the present invention, a method performed by a terminal in a wireless communication system is provided. Information on a number of code block group per TB is received from a base station. Each code block group includes at least one code block. A TB and control information scheduling the TB are received from the base station. Code block groups for the TB are identified based on a number of code blocks for the TB and the information. The number of the code blocks for the TB being determined based on the control information. The TB is decoded based on the identified code block groups. Hybrid automatic repeat request (HARQ) feedback information is transmitted to the base station based on a result of the decoding.

In accordance with another aspect of the present invention, a method performed by a base station in a wireless communication system is provided. Information on a number of a code block group per TB is transmitted to a terminal. Each code block group includes at least one code block. Code block groups for a TB are identified based on a number of code blocks for the TB and the information. The identified code block groups for the TB and control information scheduling the TB are transmitted to the terminal. HARQ feedback information for the identified code block groups is received from the terminal.

In accordance with another aspect of the present invention, a terminal in a wireless communication system is provided that includes a transceiver and controller. The controller is configured to control the transceiver to receive, from a base station, information on a number of a code block group per TB. Each code block group includes at least one code block. The transceiver is controlled to receive, from the base station, a TB and control information scheduling the TB. Code block groups for the TB are identified based on a number of code blocks for the TB and the information. The number of code blocks for the TB is determined based on the control information. The TB is decoded based on the identified code block groups. The transceiver is controlled to transmit, to the base station, HARQ feedback information, based on a result of the decoding.

In accordance with still another aspect of the present invention, a base station in a wireless communication system is provided that includes a transceiver and a controller. The controller is configured to control the transceiver to transmit, to a terminal, information on a number of code block group per TB. Each code block group includes at least one code block. Code block groups for a TB are identified based on a number of code blocks for the TB and the information. The transceiver is controlled to transmit, to the terminal, the identified code block groups for the TB and control information scheduling the TB. The transceiver is configured to control the transceiver to receive, from the terminal, HARQ feedback information for the identified code block groups.

BRIEF DESCRIPTION OF THE DRAWINGS

FIG. 1O is a flowchart of a receiver according to embodiment 2 of the present invention;

DETAILED DESCRIPTION

Figure 1A:
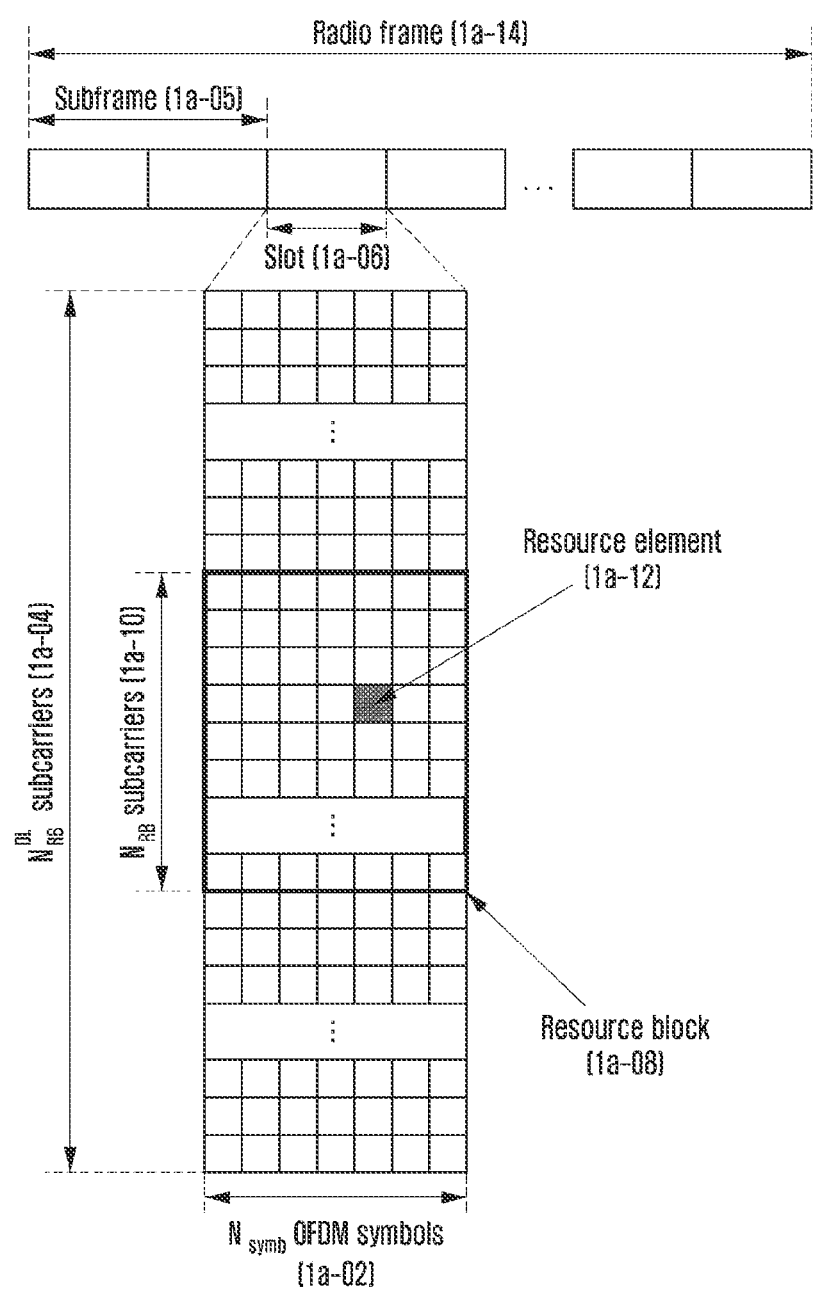
FIG. 1A is a diagram illustrating a basic time-frequency resource structure for transmitting downlink data or control channels in an LTE system.

Exemplary embodiments of the present invention are described in detail with reference to the accompanying drawings, Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in marry different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System", Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments underway for system network improvement based on advanced small cells, cloud Radio Access Networks (RANs), ultra-dense networks, device-to-device (D2D) communication, wireless backhaul, moving network, cooperative communication, Coordinated Multi-Point (COMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, a 5G new radio access technology (NR) is designed to allow for freely multiplexing various types of services onto time and frequency resources and assigning waveforms/numerologies and reference signals dynamically or freely to meet service-specific requirements. For wireless communications in which great importance is given to the channel quality and interference measurement for providing terminals with optimal services, correct channel state measurement is inevitable. Unlike the 4G communication in which the channel and interference characteristics rarely vary with the frequency resources, the 5G communication is characterized in that the channel and interference characteristics significantly vary with services, which makes it necessary to support subsets of a frequency resource group (FRG) for separate measurements thereof. Meanwhile, the services being supported in the NR system are categorized into three categories: enhanced mobile broadband (eMBB), massive machine type communications (mMTC), and ultra-reliable and low-latency communications (URLLC). The eMBB services are characterized by high capacity and high mobility communication, the mMTC services by low power consumption and massive connections, and the URLLC by ultra-high reliability and low latency. The requirements may vary with the type of services to be provided to the terminal.

In order for the communication system to provide users with various types of services, there is a need of a method and apparatus for multiplexing different services into the same time period to meet the service-specific requirements.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. A module may include one or more processors.

The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in the $3^{rd}$ Generation Partnership Project (3GPP), High Rate Packet Data (HRPD) defined in the $3^{rd}$ Generation Partnership Project-2 (3GPP2), Ultra Mobile Broadband (UMB), and 802.16e defined in the IEEE)) capable of providing data and multimedia services beyond the early voice-oriented services. Meanwhile, 5G or NR standardization is in progress for 5G wireless communication systems.

The LTE system as one of the representative broadband wireless communication systems uses orthogonal frequency division multiplexing (OFDM) in the downlink (DL) and single carrier frequency division multiple access (SC-FDMA) in the uplink (UL). The term "uplink" denotes a radio link for transmitting data or control signals from a terminal that is interchangeably referred to as user equipment (UE) and mobile station (MS) to a base station (BS) that is interchangeably referred to as evolved node B (eNB), and the term "downlink" denotes a radio link for transmitting data or control signals from a base station to a terminal. Such multiple access schemes are characterized by allocating the time-frequency resources for transmitting user-specific data and control information without being overlapped with each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. An HARQ scheme is designed to operate in such a way that a receiver, when it fails in decoding data, sends a transmitter a negative acknowledgement (NACK) indicative of the decoding failure in order for the transmitter to retransmit the corresponding data on the physical layer. The receiver combines the retransmitted data with the decoding-failed data to improve data reception performance. The HARQ scheme may also be designed to operate in such a way that the receiver, when it succeeds in decoding data, sends the transmitter an Acknowledgement (ACK) indicative of successful decoding in order for the transmitter to transmit new data.

FIG. 1A is a diagram illustrating a basic time-frequency resource structure for transmitting downlink data or control channels in an LTE system.

In FIG. 1, the horizontal axis denotes the time, and the vertical axis denotes the frequency. The smallest transmission unit in the time domain is an OFDM symbol, and $N_{symb}$ OFDM symbols 1a-02 form a slot 1a-06, and 2 slots form a subframe 1a-05. Each slot spans 0.5 ms, and each subframe spans 1.0 ms. A radio frame 1a-14 is a time unit consisting of 10 subframes. In the frequency domain, the smallest transmission unit is a subcarrier, and the total system transmission bandwidth consists of $N_{BW}$ subcarriers 1a-04.

In the time-frequency resource structure, the basic resource unit is a Resource Element (RE) 1a-12 indicated by an OFDM symbol index and a subcarrier index. A Resource Block (RB) (or Physical Resource Block (PRB)) 1a-08 is defined by $N_{symb}$ consecutive OFDM symbols 1a-02 in the time domain and $N_{RB}$ consecutive subcarriers 1a-10 in the frequency domain.

That is, one RB 1a-08 consists of $N_{symb} \times N_{RB}$ REs 1a-12. Typically, the RB is the smallest data transmission unit. In the LTE system, $N_{symb}=7$, $N_{RB}=12$, and $N_{BW}$ and $N_{RB}$ are proportional to the system transmission bandwidth; a non-LTE system may use different values.

The data rate increases in proportion to the number of RBs scheduled to the terminal. For the LIE system, 6 transmission bandwidths are defined. In the case of an FDD system in which downlink and uplink are separated in frequency, the downlink transmission bandwidth and uplink transmission bandwidth may differ from each other.

The channel bandwidth denotes an RF bandwidth in comparison with the system transmission bandwidth. Table 1 shows the relationship between the system transmission bandwidth and channel bandwidth defined in the LTE standard. For example, an LTE system having a 10 MHz channel bandwidth uses the transmission bandwidth of 50 RBs.

TABLE 1

| Channel bandwidth, $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies, at every subframe, with the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

HARQ process number: HARQ process number indicates a process number of HARQ.

New data indicator: New data indicator indicates whether the HARQ transmission is an initial transmission or a retransmission.

Redundancy version: Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH) or Enhanced PDCCH (EPDCCH) after undergoing a channel coding and modulation process. In the following description, PDCCH transmission/reception may be understood as DCI transmission/reception on the PDCCH. Other channels may be understood in a similar way.

Typically, the DCI is configured and transmitted through each independent PDCCH by being channel-coded after adding a Cyclic Redundancy Check (CRC) which is scrambled separately with a particular Radio Network Temporary Identifier (RNTI) (or a terminal identifier) for each terminal. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using MCS as part of the control information constituting the DCI, the base station notifies the terminal of the modulation scheme applied to the PDSCH to be transmitted and the size of data (e.g., Transport Block Size (TBS)) to be transmitted. In an embodiment, the MCS has a bitwidth of 5 or less than or greater than 5. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64 QAM, and they have modulation orders ($Q_m$) 2, 4, and 6, respectively. That is, the QPSK modulation transmits 2 bits per symbol, the 16 QAM transmits 4 bits per symbol, and the 64 QAM transmits 6 bits per symbol. It may also be possible to use 256 QAM or higher order modulation depending on the system.

Figure 1B:
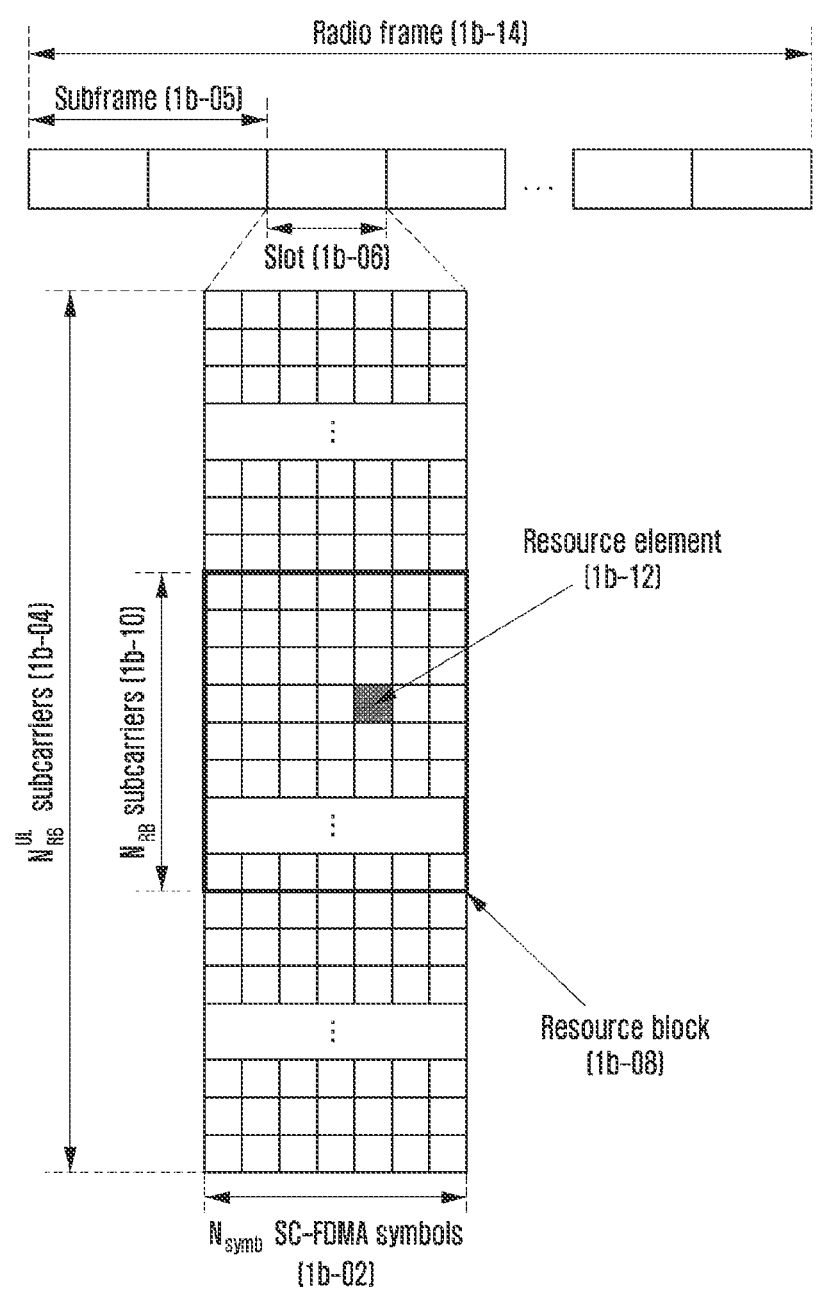
FIG. 1B is a diagram illustrating a basic time-frequency resource structure for transmitting uplink data or control channels in an LTE-A system.

FIG. 1B is a diagram illustrating a basic time-frequency resource structure for transmitting uplink data or control channels in an LTE-A system.

In FIG. 1B, the horizontal axis denotes the time, and the vertical axis denotes the frequency. The smallest transmission unit in the time domain is an SC-FDMA symbol, and $N_{symb}^{UL}$ SC-FDMA symbols 1b-02 form a slot 1b-06. Two slots form a subframe 1b-05. The smallest transmission unit in the frequency domain is a subcarrier, and the total system transmission bandwidth consists of $N_{BW}$ subcarriers 1b-04. $N_{BW}$ may be proportional with the system transmission bandwidth.

In the time-frequency domain, the basic resource unit is RE 1b-12, and each RE is defined by one SC-FDMA symbol index and one subcarrier index. A resource block (RB) pair 1b-08 is defined by $N_{symb}^{UL}$ consecutive SC-FDMA symbols in the time domain and NscRB consecutive subcarriers in the frequency domain. Accordingly, one RB consists of $N_{symb}^{UL} \times N_{sc}^{RB}$ REs. Typically, the smallest data or control information transmission unit is RB. A physical uplink control channel (PUCCH) is mapped to a frequency region corresponding to one RB and transmitted during a time period of one subframe.

The LTE standard defines a relationship between the PDSCH or the PDCCH/EPDCCH carrying a semi-persistent scheduling (SPS) release and the PUCCH or physical uplink shared channel (PUSCH) carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE system employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n^{th}$ subframe, it transmits UL control information including the HARQ ACK/NACK corresponding to the DL data to the eNB through the PUCCH or PUSCH at the $(n+k)^{th}$ subframe. Here, k is determined differently depending on the duplex mode (i.e., FDD or time division duplex (TDD)) and subframe configuration in use by the LTE system. For example, k is fixed to 4 in the FDD LTE system. Meanwhile, k may vary according to the subframe configuration and subframe index in the TDD LTE system.

The LTE system employs a synchronous HARQ scheme with a fixed data transmission timing for UL transmission distinct from the DL HARQ. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receives a PDCCH carrying UL scheduling control information or a PHICH carrying a DL HARQ ACK/NACK from the eNB at the $n^{th}$ subframe, it transmits UL data through a PUSCH at the $(n+k)^{th}$ subframe based on the control information. Here, k is determined differently depending on the duplex mode in use, i.e., FDD or TDD, and its configuration. For example, k is fixed to 4 in the FDD LTE system. Meanwhile, k may vary according to the subframe configuration and subframe index in the TDD LTE system.

In the FDD LTE system, the eNB transmits a UL grant or a DL control signal and data to the UE at the $n^{th}$ subframe, the UE receives the UL grant or the DL control signal and data at the $n^{th}$ subframe. If UE receives a UL grant at the $n^{th}$ subframe, it transmits uplink data at the $(n+4)^{th}$ subframe.

If the UE receives a DL control signal and data at the $n^{th}$ subframe, it transmits an HARQ ACK/NACK corresponding to the DL data at the $(n+4)^{th}$ subframe. In this case, a time period given for the UE to prepare UL data transmission scheduled via the UL grant or transmission of HARQ ACK/NACK corresponding to the DL data becomes 3 ms, which is equal to the duration of three subframes.

The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode (i.e., FDD or TDD) and its configuration in use by the LTE system. For example, k is fixed to 4 in the FDD LTE system. Meanwhile, k may vary according to the subframe configuration and subframe index in the TDD LTE system.

Figure 1C:
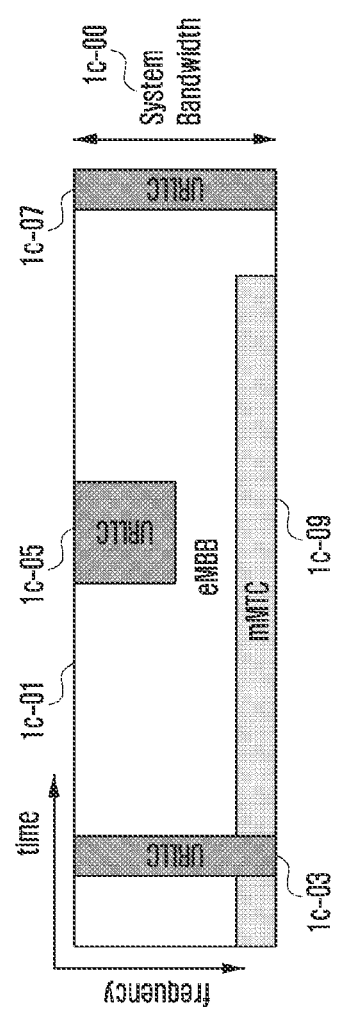
FIG. 1C is a diagram illustrating frequency-time resources allocated for eMBB, URLLC, and mMTC data transmission in a communication system.
Figure 1D:
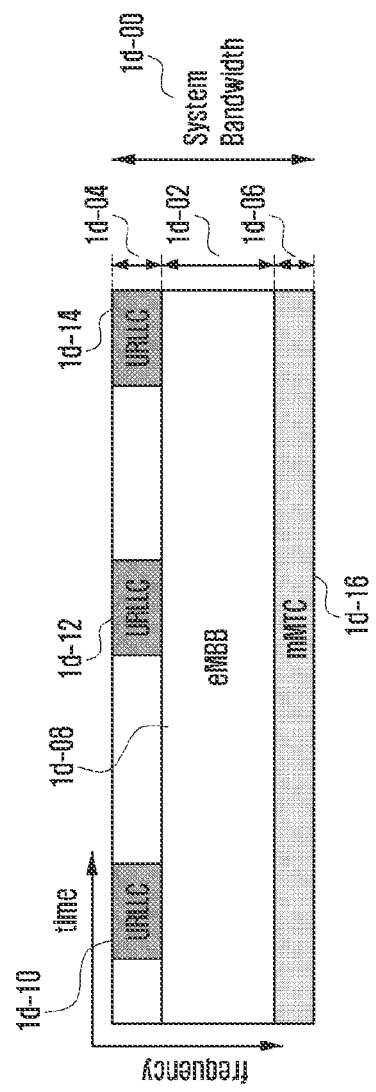
FIG. 1D is a diagram illustrating frequency-time resources allocated for eMBB, URLLC, and mMTC data transmission in a communication system.

FIGS. 1C and 1D are diagrams illustrating frequency-time resources allocated for transmitting data of eMBB, URLLC, and mMTC services being considered in the 5G or NR system.

FIGS. 1C and 1D show how the frequency and time resources are allocated for information transmission in a system.

In FIG. 1C, the eMBB, URLLC, and mMTC data are mapped across the entire system frequency band 1c-00. If the URLLC data 1c-03, 1c-05, and 1c-07 are generated to be transmitted during the transmission of the eMBB data 1c-01 and mMTC data 1c-09 in specific frequency bands, parts of the eMBB data 1c-01 and mMTC data 1c-09 may be punctured such that the URLLC data 1c-03, 1c-05, and 1c-07 are inserted.

Because the URLLC services are delay-sensitive among the aforementioned services, the URLLC data 1c-03, 1c-05, and 1c-07 may occupy parts of the resources allocated for eMBB data 1c-01. In the case of transmitting the URLLC data on the resources allocated for the eMBB data, the eMBB data may not transmitted on the overlapping frequency-time resources, which may degrade eMBB data transmission throughput. That is, in the above case, the resource allocation for the URLLC data transmission may cause eMBB data transmission failure.

In FIG. 1D, the system frequency band 1d-00 is divided into sub-bands 1d-02, and 1d-06 for data transmissions of different services. The sub-band configuration information may be preconfigured and transmitted from a base station to a terminal.

It may also be possible for base stations or network nodes to share the sub-band configuration information to provide corresponding services without separately transmitting the sub-band configuration information to the terminal. In FIG. 1D, the sub-bands 1d-02, 1d-04, and 1d-06 are allocated for eMBB data transmission, URLLC data transmission, and mMTC data transmission, respectively.

Throughout the embodiment, the transmission time interval (TTI) for URLLC transmission may be shorter that the TTI for eMBB or mMTC transmission. The acknowledgement corresponding to the URLLC data may be transmitted more quickly than the acknowledgement corresponding to the eMBB or mMTC data, resulting in low latency information transmission/reception.

Figure 1E:
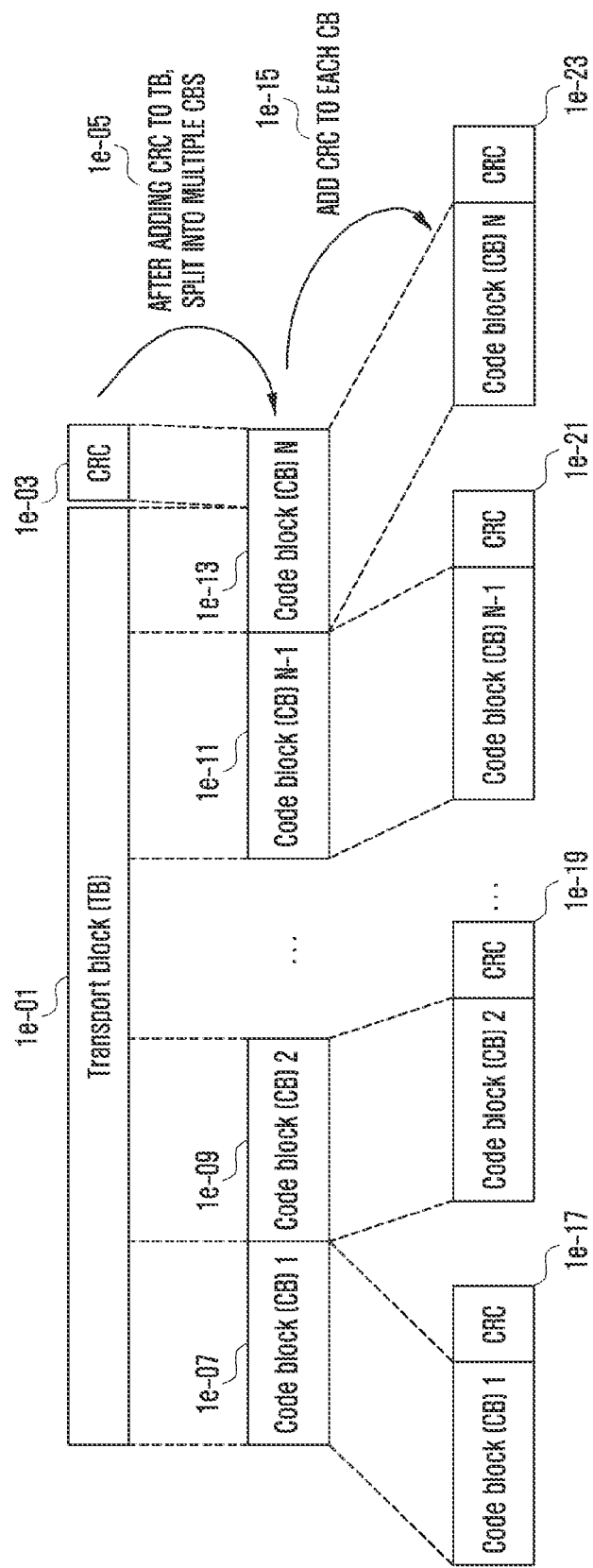
FIG. 1E is a diagram illustrating a procedure for splitting a transport block into multiple code blocks and adding a CRC to the code blocks according to an embodiment of the present invention.

FIG. 1E is a diagram illustrating a procedure for splitting a transport block into multiple code blocks and adding a CRC to the code blocks.

In reference to FIG. 1E, a CRC 1e-03 may be added at the beginning or end of a transport block (TB) 1e-01 to be transmitted in uplink or downlink. The CRC may have a fixed length of 16 bits or 24 bits or a variable length varying with channel condition and may be used for determining whether the channel coding is successful.

A block including the TB 1e-01 and the CRC 1e-03 may be split into multiple code blocks (CBs) 1e-07, 1e-09, 1e-11, and 1e-13 as denoted by reference number 1e-05. Each CB has a predetermined maximum size as far as possible and, in this case, the last CB 1e-13 may be smaller in size than the other code blocks. It may be possible to add 0s, random values, or 1s to the last CB to make the last CB to be equal in length to other CBs.

It may be possible to add CRCs 1e-17, 1e-19, 1e-21, and 1e-23 to the respective CBs. The CRC may have a fixed length of 16 bits, 24 bits, or the like and may be used for determining whether the channel coding is successful.

However, adding the CRC 1e-03 to the TB and adding the CRCs 1e-17, 1e-19, 1e-21, and 1e-23 to the respective CBs may be omitted depending on the type of the channel code to be applied to the CBs. For example, in the case of applying an LDPC code rather than a turbo code, adding the CRCs 1e-17, 1e-19, 1e-21, and 1e-23 to the respective CBs may be omitted. However, even if the LDPC code is applied, the CRCs 1e-17, 1e-9, 1e-21, and 1e-23 may be added to the CBs. Even in the case of using a polar code, it may be possible to omit adding any CRC.

Figure 1F:
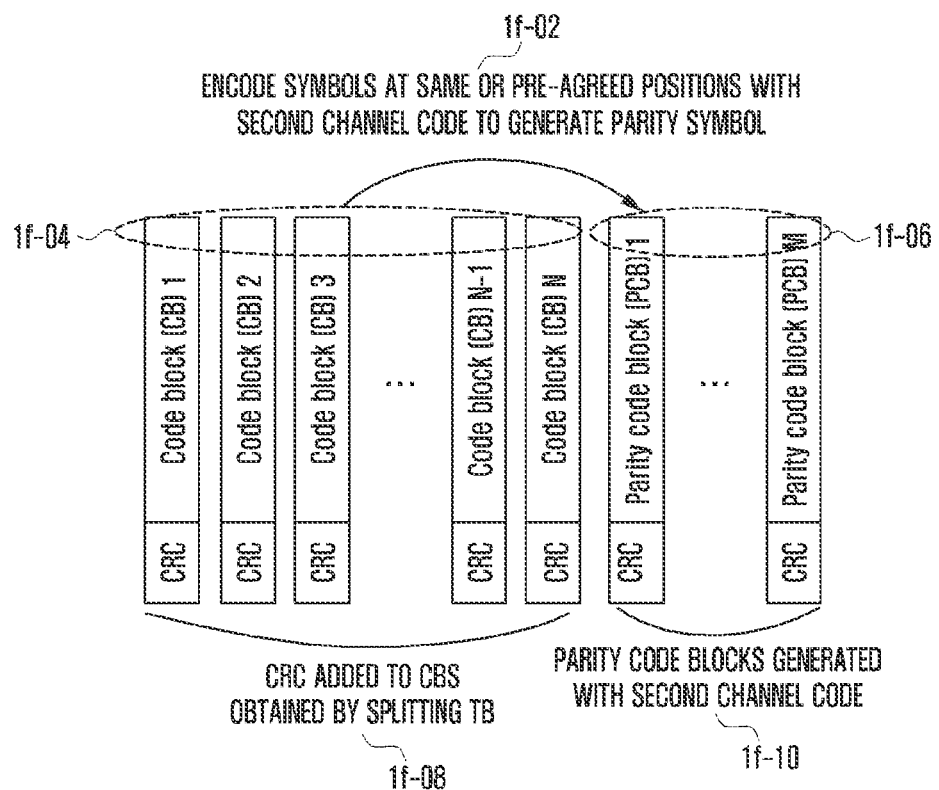
FIG. 1F is a diagram illustrating an outer code-based coding structure according to an embodiment of the present invention.
Figure 1G:
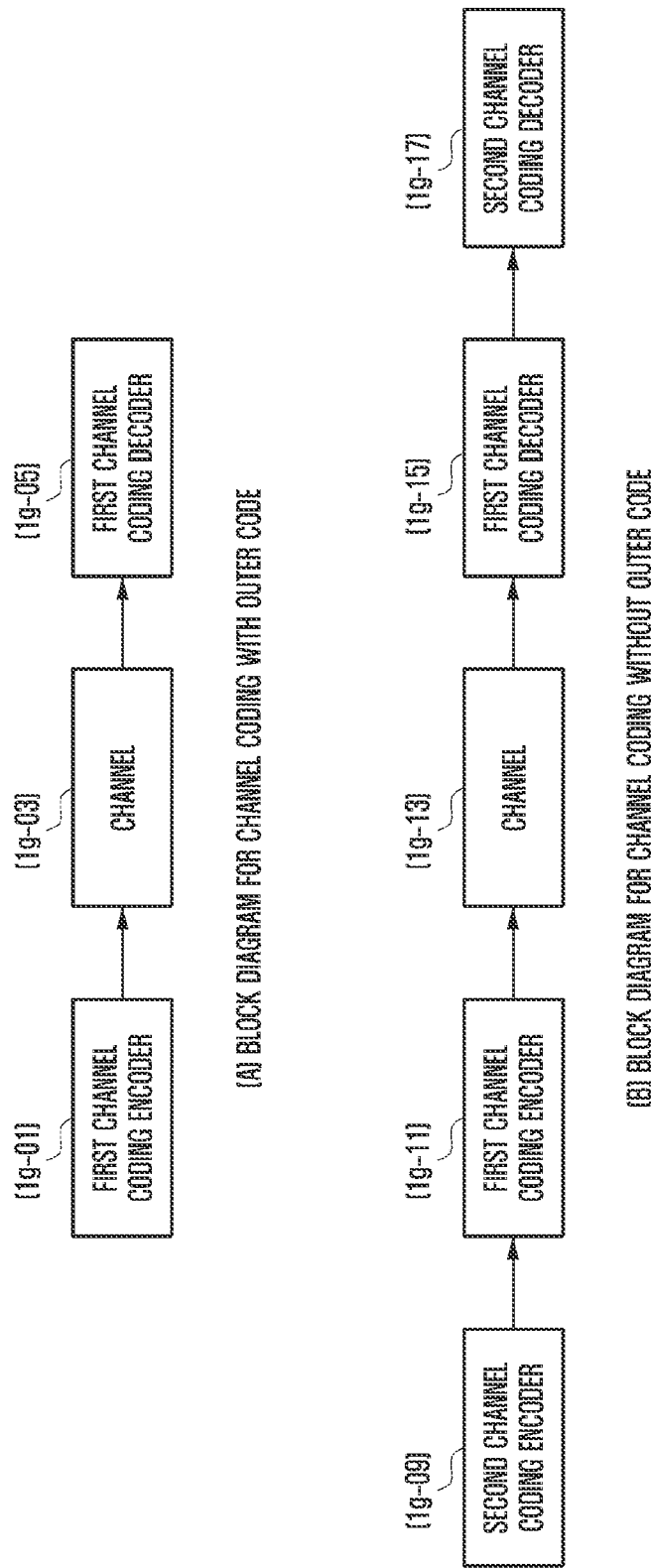
FIG. 1G is a diagram illustrating channel coding processes with or without applying an outer code according to another embodiment of the present invention.

FIG. 1F is a diagram illustrating an outer code-based transmission method, and FIG. 1G is a diagram illustrating a structure of an outer code-based communication system.

A description is made of the method for transmitting a signal with an outer coded with reference to FIGS. 1F and 1G.

In FIG. 1F, a TB is split into multiple CBs of which bits or symbols 1f-04 located at identical bit-positions are encoded with a second channel code to generate parity bits or symbols 1f-06 as denoted by reference number 1f-02. Next, CRCs 1f-08 and 1f-10 may be respectively added to the CBs and parity CBs generated by encoding with the second channel code. It may be possible to add the CRC or not depending on the type of the channel code. For example, if a turbo code is used as a first channel code, the CRCs 1f-08 and 1f-10 are added and then the CBs and parity CBs may be encoded with the first channel code.

In the case of using the outer code, the data to be transmitted passes the second channel coding encoder 1g-09. Examples of the channel coded for the second channel coding may include a Reed-Solomon code, a BCH code, a Raptor code, and a parity bit generation code. The bits or symbols that pass the second channel coding encoder 1g-09 pass a first channel coding encoder 1g-11. Examples of the channel code for the first channel coding may include a Convolutional code, an LDPC code, a Turbo code, and a Polar code.

If the channel-coded symbols are received by a receiver over a channel 1g-13, the receiver may process the received signals by means of a first channel coding decoder 1g-15 and a second channel coding decoder 1g-17 in serial order. The first and second channel coding decoders 1g-15 and 1g-17 may perform opposite operations of the first and second coding encoders 1g-11 and 1g-09, respectively.

In the case of not using the outer code, only the first channel coding encoder 1g-11 and the first channel coding decoder 1g-05 are used in the channel coding block diagram with no second channel coding encoder and decoder. Even in the case of not using the outer code, the first channel coding decoder 1g-05 may have an identical configuration with that of the first channel coder 1g-11 for the case of using the outer coder.

In the following description, an eMBB service is referred to as first type service, and eMBB service data are referred to as first type data. The terms "first type service" and "first type data" are not limited to eMBB, and they may include other service types requiring a high speed data transmission or broadband transmission.

Meanwhile, a URLLC service is referred to as second type service, and URLLC service data are referred to as second type data. The terms "second type service" and "second type data" are not limited to URLLC, and they may include other service types requiring low latency, high reliability transmission, or low latency and high reliability transmission.

Meanwhile, an mMTC service is referred to as third type service, and mMTC service data are referred to as third type data. The terms "third type service" and "third type data" are not limited to mMTC, and they may include other service types requiring low speed, broad coverage, or low power transmission. In an embodiment, the first type service may be understood as including or not including the third type service.

The physical layer channel structures for transmitting the three types of services or data may differ from each other. For example, they may differ in at least one of TTI length, frequency resource allocation unit, control channel structure, and data mapping scheme.

Although three types of services and three types of data are enumerated above, the principle of the present invention can be applied to the cases were a larger number of service and data types exist.

In an embodiment, the terms "physical channel" and "signal" in use for LTE and LTE-A systems are used for explaining the proposed method and device. However, the principle of the present invention is applicable to other wireless communication systems as well as the LTE and LTE-A systems.

As described above, the present invention defines communication operations between a terminal and a base station for transmitting the first, second, and third type services or data and proposes a method for serving the terminals in such a way of scheduling the different types of services or data for the respective terminals in the same system. In the present invention, the terms "first type terminal", "second type terminal", and "third type terminal" are intended to indicate the terminals for which the first, second, and third types of services or data, respectively, are scheduled. In an embodiment, the first type terminal, second type terminal, and third type terminal may be identical with or different from each other.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification. In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. The term "downlink (DL)" denotes a radio transmission path from a base station to a terminal, and the term "uplink (UL)" denotes a radio transmission path from the terminal to the base station. Although the description is directed to an LTE or LTE-A system by way of example, the present invention is applicable to other communication systems having a similar technical background and channel format. For example, the present invention is applicable to the 5G mobile communication technology (5G new radio (NR)) under development for after LTE-A. It will be understood by those skilled in the art that the present invention can be applied even to other communication systems with a slight modification without departing from the spirit and scope of the present invention.

In the present invention, the TTI denotes a unit of time for transmitting control and data signals or only the data signal. In the legacy LTE system, by way of example, the TTI is equal in length to one subframe as a unit of time, i.e., 1 ms, in downlink. In the present invention, the TTI may denote a unit of time for transmitting a control and data signal or only the data signal in uplink. In the legacy LTE system, the TTI is a time unit of 1 ms equal in length with one subframe in both downlink and uplink.

Meanwhile, one of the important criteria determining the throughput of a wireless cellular communication system is packet data latency. LTE employs a TTI of 1 ms, which is identical with the length of one subframe. An LTE system employing a TTI of 1 ms may support a UE operating with a TTI shorter than 1 ms (short-TTI LTE).

Meanwhile, the 5G NR may employ a TTI shorter than 1 ms. The short-TTI UE is suitable for latency-sensitive services such as voice over LTE (VoLTE) and remote control services and is expected to be a means for realizing mission-critical IoT. It may also be expected that the short-TTI UE can be a means for realizing cellular-based mission-critical IoT.

In the present invention, the terms "physical channel" and "signal" in use for the LTE or LTE-A system may be interchangeably used with the terms "data" or "control signal". For example, although PDSCH is a physical channel carrying normal-TTI data, it may be referred to as normal-TTI data in the present invention.

In the present invention, the uplink grant signal and the downlink data signal are referred to as first signal. In the present invention, the uplink data signal scheduled by the uplink grant and the HARQ ACK/NACK corresponding to a downlink data signal are referred to as second signal. In the present invention, if one of the signals being transmitted from the base station to the UE requires a response thereto, it may be the first signal, and the response of the UE to the first signal may be the second signal. In the present invention, the service type of the first signal may fall in three categories: eMBB, mMTC, and URLLC.

In the present invention, the TTI length of the first signal denotes the time length for transmitting the first signal. In the present invention, the TTI length of the second signal denotes the time length for transmitting the second signal. In the present invention, the second signal transmission timing denotes the information indicating the timing at which the UE transmits the second signal and the base station receives the second signal, and it may be referred to as second signal transmission/reception timing.

Unless the TDD system is specified, the description is made under the assumption of the FDD system. However, the method and apparatus proposed in the present invention for use in the FDD system is applicable to the TTD system with slight modifications.

In the present invention, the term "higher layer signaling" denotes a signaling method for the base station to transmit a signal to the UE on a downlink data channel of the physical layer or for the UE to transmit a signal to the base station on an uplink data channel of the physical layer and may be referred to as RRC signaling or MAC control element (CE) signaling.

In the following description, the term "transmit end" may be used to indicate a base station in downlink and terminal in uplink. The term "receive end" may be used to indicate the terminal in downlink and the base station in uplink.

In the following description, the term "sub-TB" may be understood as a virtual concept indicating a bundle of one or more CBs.

Embodiment 1

Embodiment 1 is directed to a method for splitting a TB into multiple CBs in such a way of splitting the TB into multiple sub-TBs and then splitting each sub-TB into multiple CBs.

Figure 1H:
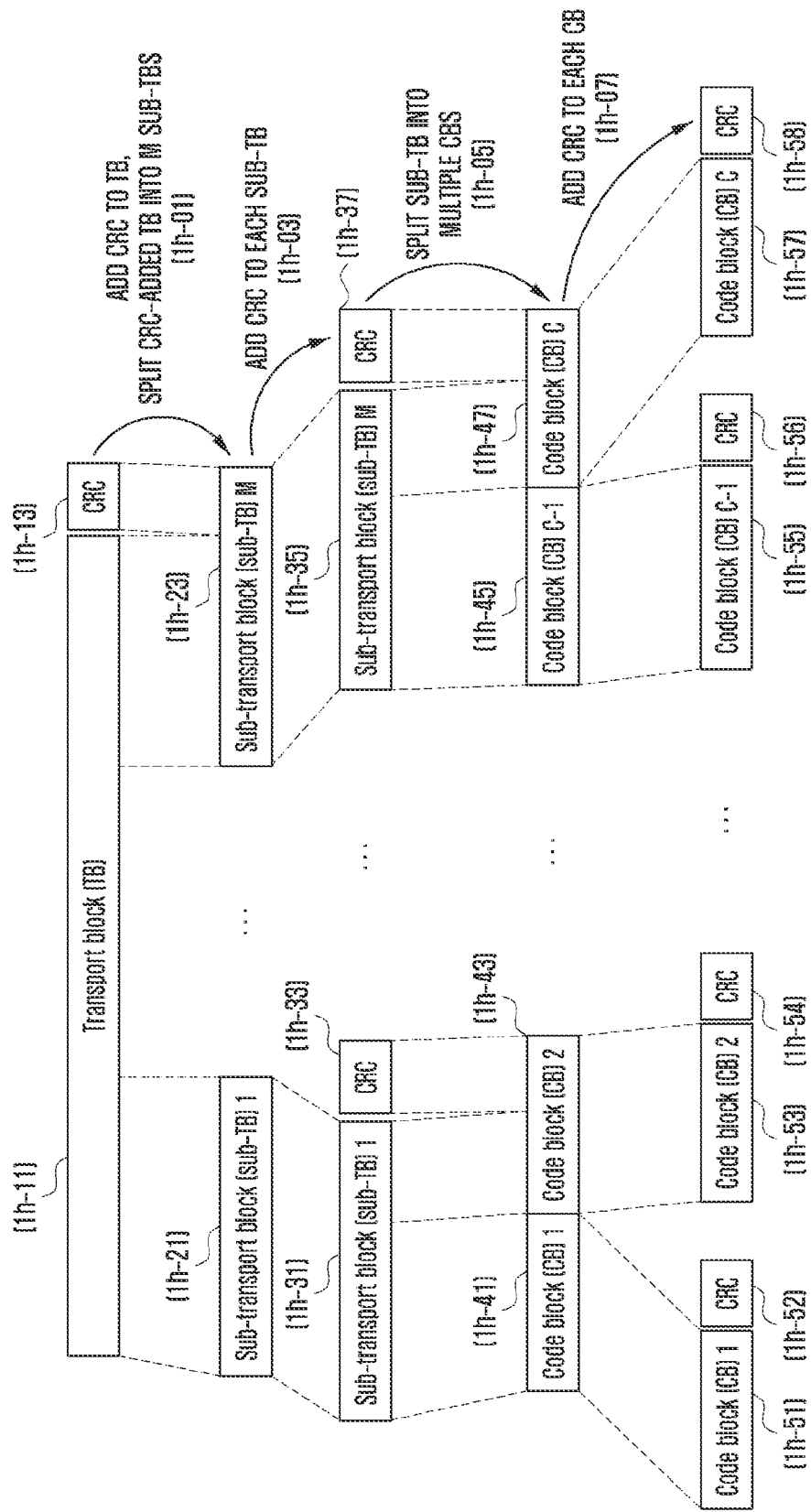
FIG. 1H is a diagram illustrating a method for configuring sub-TBs and CBs and adding CRCs to sub-TBs and CBs according to an embodiment of the present invention.

FIG. 1H is a diagram illustrating a method for splitting a TB into M sub-TBs as denoted by reference number 1h-01 and splitting each sub-TB into one or more CBs as denoted by reference number 1h-05. Reference number 1h-11 denotes a TB delivered from a higher layer to a physical layer. The physical layer regards the TB 1h-11 as data.

A CRC 1h-13 may be added to the TB. The CRC 1h-13 may be generated with the TB 1h-11 and a cyclic generator polynomial, which may be defined in various manners. For example, assuming that the cyclic generator polynomial is $g_{CRC24A}(D)=D24+D23+D18+D17+D14+D11+D10+D7+D6+D5+D4+D3+D+1$ for a 24-bit CRC, if L=24, it may be possible to determine $a_0 D^{A+23}+a_1 D^{A+22}+\ldots+a_{A-1}D^{24}+p_0 D^{23}+p_1 D^{22}+\ldots+p_{22}D^1+p_{23}$ divisible by $g_{CRC24A}(D)$ with the remainder 0 as CRCs CRC $p_0, p_1, p_2, p_3, \ldots, p_{L-1}$.

Although the description has been made to the case where the CRC length L is 24, L may be set to 12, 16, 24, 32, 40, 48, 64, or the like. After the CRC is added to the TB, the TB is split into M sub-TBs as denoted by reference number 1h-01. That is, a transmission unit as a result of adding the CRC to the TB is divided into M sub-TBs 1h-21 and 1h-23. To the sub-TBs 1h-31 and 1h-35, a CRC 1h-33 and 1h-37 is added as denoted by reference number 1h-03. The CRC being added to the sub-TB may differ from the CRC added to the TB in length or cyclic generator polynomial used in generating the CRC. A transmission unit as a result of adding the CRC to the sub-TB is split into multiple CBs 1h-41, 1h-42, 1h-45, and 1h-47 as denoted by reference number 1h-05. To the CBs 1h-51, 1h-53, 1h-55, and 1h-57, CRCs 1h-52, 1h-54, 1h-56, and 1h-58 are added, respectively, as denoted by reference number 1h-07.

Figure 1I:
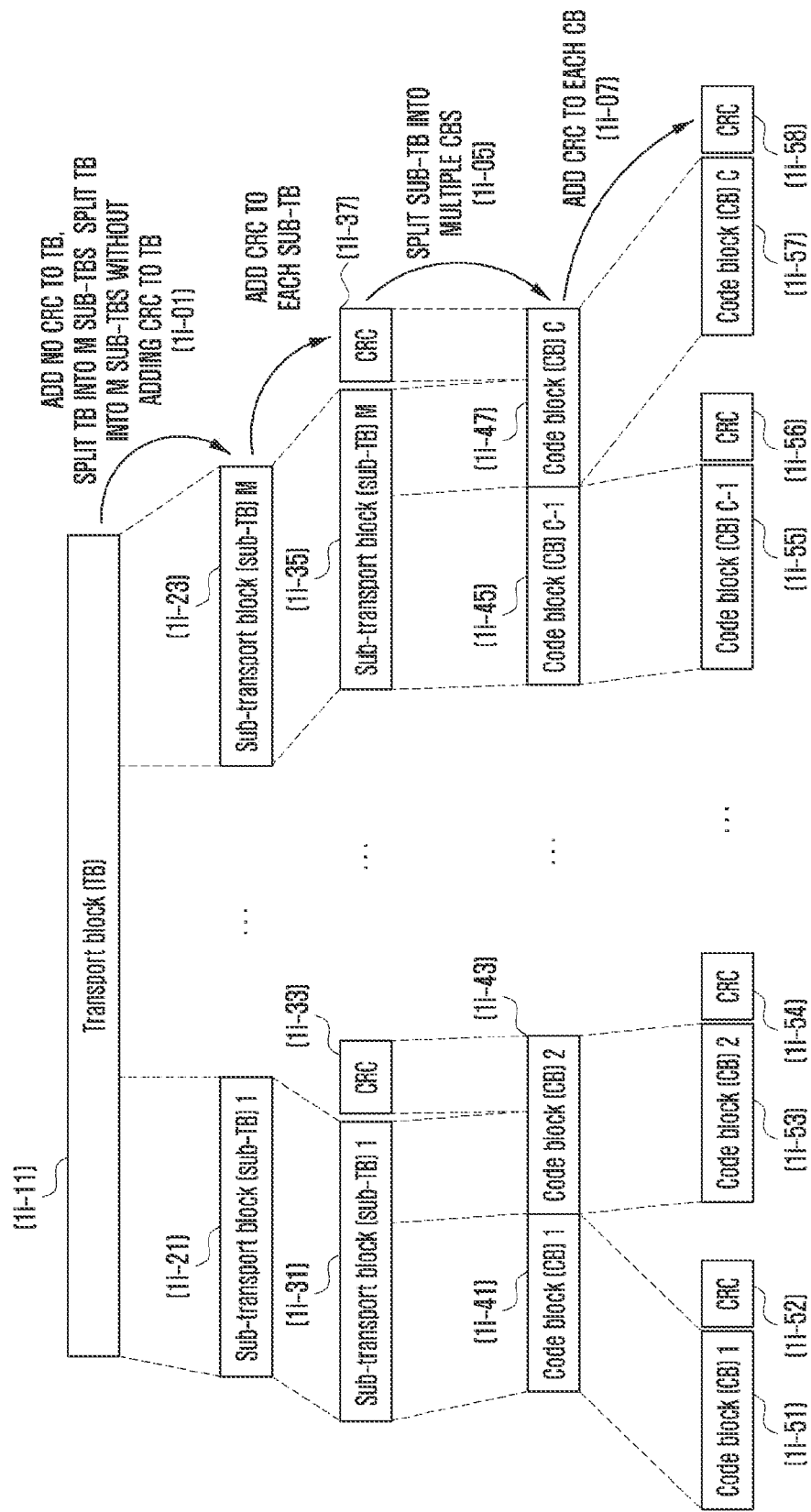
FIG. 1I is a diagram illustrating a method for configuring sub-TBs and CBs and adding CRCs to the sub-TBs and CBs according to another embodiment of the present invention.
Figure 1J:
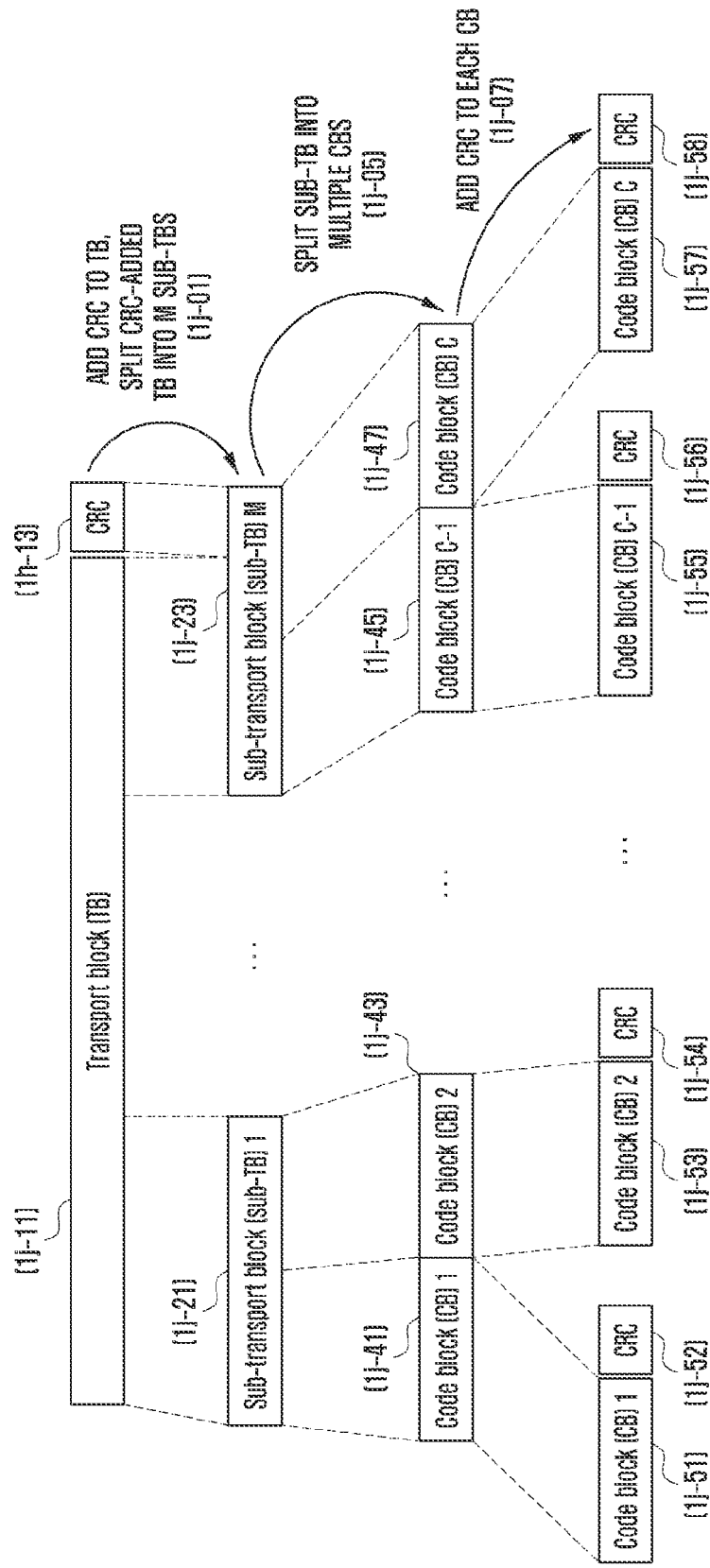
FIG. 1J is a diagram illustrating a method for configuring sub-TBs and CBs and adding CRCs to the sub-TBs and CBs according to another embodiment of the present invention.
Figure 1K:
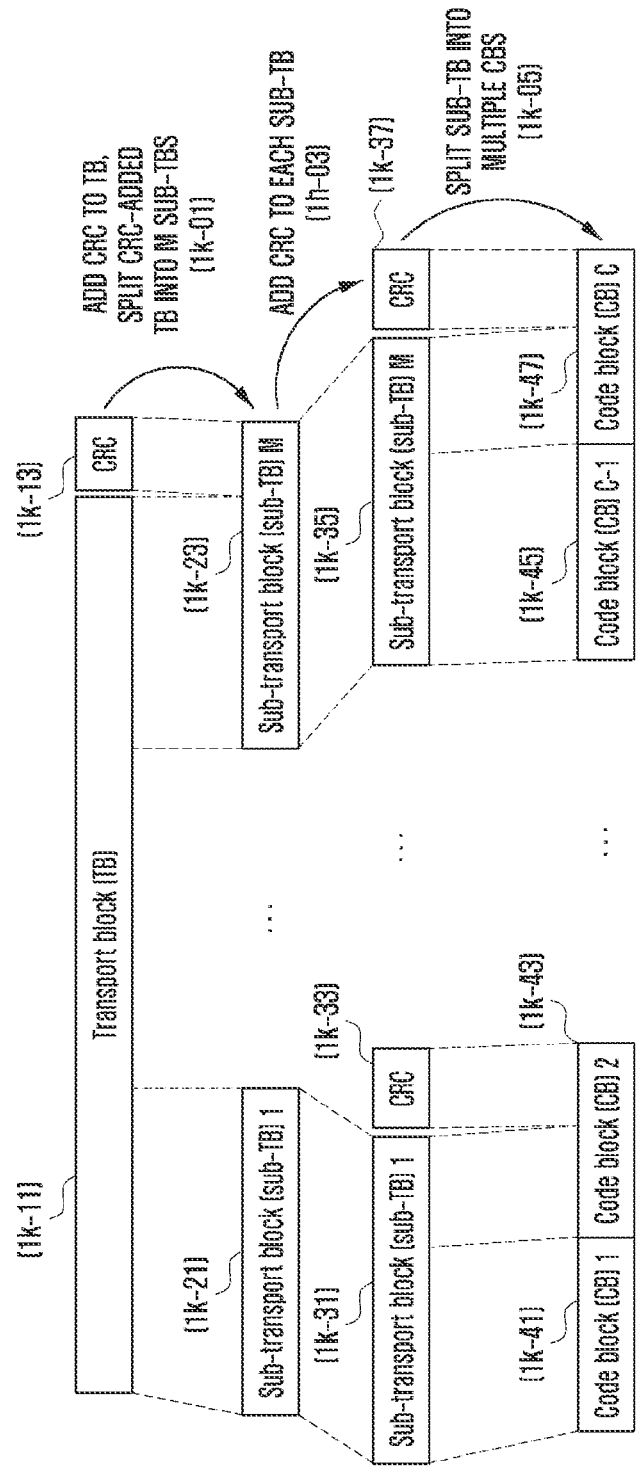
FIG. 1K is a diagram illustrating a method for configuring sub-TBs and CBs and adding CRCs to the sub-TBs and CBs according to another embodiment of the present invention.

FIGS. 1I, 1J, and 1K are diagrams illustrating alternatives to the method depicted in FIG. 1H. Unlike the method of FIG. 1H in which the CRC 1h-13 is added to the TB, the CRC 1h-33 and 1h-37 to the sub-TBs, and the CRC 1h-52, 1h-54, 1h-56, and 1h-58 to the CBs, no CRC is added to the TB in the method of FIG. 1I. This aims to reduce CRC overhead. No CRC is added to the sub-TBs in the method of FIG. 1J; no CRC is added to the CBs in the method of FIG. 1K.

Embodiment 1-1

Embodiment 1-1 is directed to a method for determining a number of sub-TBs and transmitting the information of M to a terminal in embodiment 1.

Considering M sub-TBs constituting a TB, the number of sub-TBs M may be determined and notified to the base station or UE in various manners. For example, it may be possible to determine M 1) by splitting a TB by the length of the TTI in which data are scheduled, 2) as being indicated by a specific bit of downlink control information (DCI), 3) as being indicated via RRC signaling, 4) based on the size of TB, 5) based on the total number of CBs, and using a combination of two or more of 1) to 5).

Method 1) for determining M value based on the length of TTS in which data are scheduled is to determine the M value based on how many partial retransmission-available TTIs can be included in the TTI length is use for an initial transmission. For example, if the initial transmission is scheduled in a slot comprised of 7 OFDM symbols and a mini-slot consists of 2 or 3 symbols such that three 2-symbol or 3-symbol mini-slots can be included in one slot, M is set to 3.

This is the case where one TB may consist of 3 sub-TBs. It may also be possible to be set to a multiple of 2 that is closest to 3, the largest multiple of 2 that is less than 3, or the smallest multiple of 2 that is greater than 3. That is, M may be set to 2 or 4 in the above case. That is, the method for determining M based on the TTI length with which initial transmission is scheduled may be altered in various manners.

Method 2) is for a base station to notify a terminal of the M value using specific bits of the DCI as a downlink control signal. The control signal may be a downlink assignment or an uplink grant. Method 3) is for the base station to notify the terminal of the M value via RRC signaling. The base station may transmit the M value information to the terminal via RRC signaling, By combining methods 2) and 3), it may be possible to notify the terminal of the M value via RRC signaling and instruct the terminal to transmit an HARQ-ACK bit per partial retransmission or sub-TB using 1 bit of the DCI.

Method 4) for determining the M value based on the TB size (TBS) is to determine the M value by comparing the TBS in use for initial transmission with a predetermined value. It is assumed that the maximum allowed size of a CB is Z and the TBS is B. It is also assumed that the length of the CRC being added to a sub-TB is L_sub_TB($L_{sub-TB}$), the length of the CRC being added to a CB is L_CB($L_{CB}$), and the length of the CRC being added to a TB is L_TB ($L_{TB}$). It is also assumed that the number of CBs is C and the number of sub-TBs is M.

For example, if B is equal to or less than Z, M=1, L_sub_TB=0, C=1, and L_CB=0. If B is greater than Z, M value is determined as $$M = \left\lceil \frac{B}{X} \right\rceil,$$

and X value may vary with the size of one sub-TB.

Method 5) for determining the M value based on the total number of CBs is to determine the M value by dividing the number of CBs for the initial transmission by a predetermined value. This may aim to fill one sub-TB with as similar a number of CBs as possible.

Embodiment 1-2

Embodiment 1-2 is directed to a method for splitting a TB into sub-TBs and then into CBs as in embodiment 1.

Embodiment 1-2 is an example of embodiment 1 and may be altered in various manners. In this embodiment, the M value is determined based on the TTI length or indicated by a specific bit of DCI or via RRC signaling rather than determined based on the TBS or the number of CBs. In the following description, N_1 and N_2 may be values that are greater than 0 and pre-agreed between a transmitter and a receiver, and they may denote CRC lengths for CB and sub-TB, respectively.

In the following description $\lceil X \rceil$ denotes an integer greater than X and $\lfloor X \rfloor$ denotes the greatest integer less than X. In the present invention, the sub-TB may be understood as a virtual concept and a unit of a bundle of one or more CBs.

The total number of CBs "C" may be determined as follows.

```
if B≤Z,
    L_sub_TB = 0
    L_CB = 0
    Number of sub-TBs: M is reset as M=1
    Number of code blocks: C=1
    B' = B
else
    L_CB = N_1
    L_sub_TB = N_2
```

Number of code blocks: $C = \left\lceil \dfrac{B + M \cdot L_{sub-TB}}{Z - L_{CB}} \right\rceil$

```
    if C≤M
        Number of sub-TBs: M is reset as M=C
        L_sub_TB = 0
```

Number of code blocks: $C = \left\lceil \dfrac{B}{Z - L_{CB}} \right\rceil$

```
        B'=B+C·L_CB
    Else
        B'=B+C·L_CB+M·L_sub_TB
    end if
end if
```

In the above method, it may occur that a sub-TB consists of one CB, and the method may be modified such that a sub-TB consists of at least X CBs as follows.

```
if B≤Z,
    L_sub_TB = 0
    L_CB = 0
    Number of sub-TBs: M is reset as M=1
    Number of code blocks: C=1
    B' = B
else
    L_CB = N_1
    L_sub_TB = N_2
```

Number of code blocks: $C = \left\lceil \dfrac{B + M \cdot L_{sub-TB}}{Z - L_{CB}} \right\rceil$

```
    if C≤M·X
        Number of sub-TBs: M is reset as M=C
        L_sub_TB = 0
```

Number of code blocks: $C = \left\lceil \dfrac{B}{Z - L_{CB}} \right\rceil$

-continued

```
        B'=B+C·L_CB
    Else
        B'=B+C·L_CB+M·L_sub_TB
    end if
end if
```

Through the above method, the CRC lengths of the sub-TB and CB, the numbers of the sub-TBs and CBs, and total number of bits B' of the data to be transmitted are determined. A description is made of the method for splitting a TB into sub-TBs and CBs hereinafter. In the following description, $c_{rk}$ denotes the $k^{th}$ bit of the $r^{th}$ CB.

Calculate number of bits per CB:

First segment size: $K_+$ is the smallest value included in a specific set among K values satisfying $B' \leq C \cdot K$ (the specific set may be a set including values pre-agreed between the transmitter and the receiver).

```
if C=1
    number of CBs with size K_+ : C_+=1, K_=0, C_=0
else if C>1
    Second segment size: K_ is the largest value included in a specific set
    among K values satisfying K<K_+ (the specific set may be a set including
    values pre-agreed between the transmitter and the receiver).
    Δ_K = K_+ ~ K_
``` number of CBs with size $K_-$ : $C_- = \left\lfloor \dfrac{C \cdot K_+ \sim B'}{\Delta_K} \right\rfloor$

```
    number of CBs with size K_+ : C_+ = C - C_
end if
``` number of large CBs included in one sub-TB $N_+$: smallest integer among N values satisfying $C \leq M \cdot N$ number of small CBs included in one sub-TB $N_-$: largest integer among N values satisfying $M \cdot N \leq C$ number of sub-TBs having N− CBs each: $M_- = M \cdot N_+ - C$ number of sub-TBs having N+ CBs each: $M_+ = M - (M \cdot N_+ - C)$ number of 0 or NULL padding bits: $F = C_+ \cdot K_+ + C_- \cdot K_- - B'$

```
for k = 0 to F-1
    c_ok=<NULL>
end for
k = F
s = 0
for r = 0 to C-1
    if r < C_
        K_r = K_
    Else
        K_r = K_+
    end if
    if r ≤ N_M_
    if mod(r+ 1, N_) = 0; mod(x,y) is remainder
    obtained by dividing x by y
        perform [STEP 2] below
    else if
        perform [STEP 1] below
    end if
    else if
    if mod(r+ 1- M_ N_, N_+) = 0; mod(x,y) is
    remainder obtained by dividing x by y
        perform [STEP 3] below
    else if
        perform [STEP 1] below
    end if
    end if
end for
```

```
[STEP 1 start]
while k < K_r-L_CB
  c_rk = b_s
  k=k+1
  s=s+1
end while
if C > 1
    calculate L_CB-bit CRC. Filler bit is regarded as 0.
    while k < K_r
      C_rk = p_r(k+ L_CB-K_y); p_rk denotes bits of CRC
      k = k + 1
    end while
end if
k = 0
[STEP 1 end]
```

```
[STEP 2 start]
while k < K_r - L_CB - L_sub-TB
  c_rk = b_s
  k = k+1
  s = s+1
end while
if C > 1
    calculate L_CB-bit CRC. Filler bit is regarded as 0.
    while k < K_r - L_sub-TB
      C_rk = p_r(k+ L_CB-K_y); p_rk denotes bits of CRC
      k = k + 1
    end while
    if N_ >1
        calculate L_sub-TB-bit CRC. Filler bit is regarded as 0.
        while k < K_r
          C_rk = p_r(k+ L_CB-K_y); p_rk denotes bits of CRC
          k = k + 1
        end while
    end if
end if
k = 0
k = 0
[STEP 2 end]
```

```
[STEP 3 start]
while k < K_r - L_CB - L_sub-TB
  c_rk = b_s
  k = k+1
  s = s+1
end while
if C > 1
    calculate L_CB-bit CRC. Filler bit is regarded as 0.
    while k < K_r - L_sub-TB
      C_rk = p_r(k+ L_CB-K_y); p_rk denotes bits of CRC
      k = k + 1
    end while
    if N_+ > 1
        calculate L_sub-TB_bit CRC. Filler bit is regarded as 0.
        while k < K_r
          C_rk = p_r(k+ L_CB-K_y); p_rk denotes bits of CRC
          k = k + 1
        end while
    end if
end if
k = 0
[STEP 3 end]
```

Also, zero or NULL padding bits are inserted at the beginning by way of example in the above embodiment, and it may be possible to insert the padding bits in the middle or at the end.

In the above embodiment, the sub-TB with a small number of CBs is arranged at the beginning of the TB by way of example. Assuming 10 CBs and M=3, i.e., the number of sub-TB is 3, the sub-TBs with respective numbers of CBs 3, 3, and 4 are arranged in order. This means that the sub-TB including more CBs are arranged at the beginning.

Figure 1L:
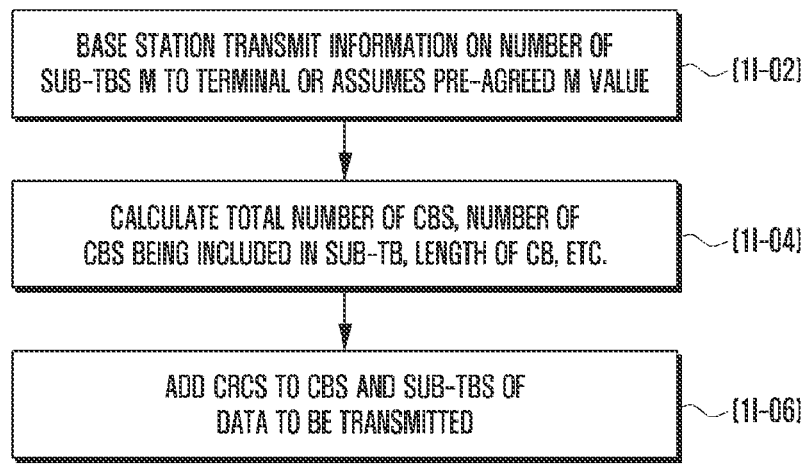
FIG. 1L is a flowchart illustrating a procedure of a transmitter according to embodiment 1-2 of the present invention.
Figure 1M:
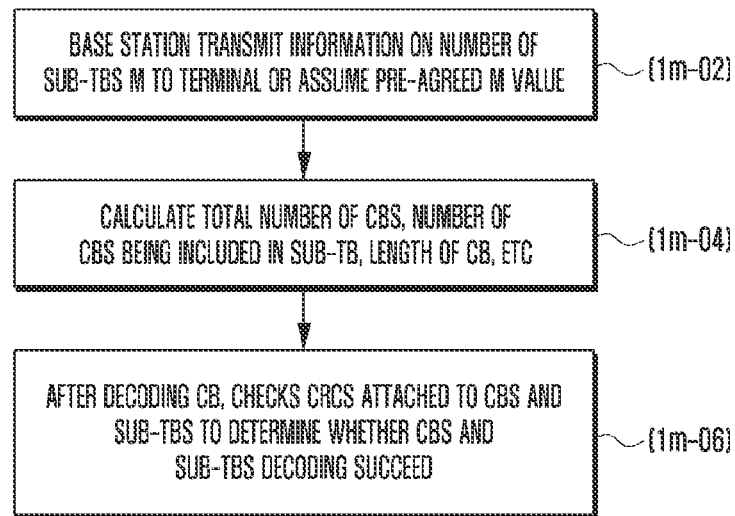
FIG. 1M is a flowchart illustrating a procedure of a receiver according to embodiment 1-2 of the present invention.

FIG. 1L is a flowchart illustrating a method for a transmitter to split a TB into one or more sub-TBs and then one or more CBs and add CRCs to the sub-TB and CR FIG. 1M is a flowchart illustrating a method for a receiver to identify one or more sub-TBs and one or more CBs to decode a TB and determine whether the TB is decoded successfully using CRC added to the sub-TB and CB.

Embodiment 2

Embodiment 2 is directed to a method for a terminal to determine a CRC length based on CRC length information transmitted by a base station and configure a CRC per CB based on the determined CRC length, which is described with reference to FIGS. 1N and 1O.

The base station transmits to the terminal the length information of a CRC to be attached to each CB when downlink or uplink data transmission is performed. The CRC length information is 1) transmitted to the terminal via RRC signaling, 2) configured in transmission to which a partial retransmission technology is applied, or 3) transmitted via a specific bit of DCI.

In method 1) based on RRC signaling, if an RRC variable, such as long_CRC_PDSCH, is set to 1, it may be possible to apply a 32-bit or 48-bit CRC rather than 23-bit CRC, by way of example. In method 2) based on application of the partial retransmission technology, it may be possible to set an RRC variable, such as partial_retransmission, to "active" or transmit DCI indicating the partial retransmission. In method 3) based on a specific bit of DCI, it may be possible to set the specific bit to indicate whether to use a short CRC or a long length CRC. The short length CRC may have a length of 16 bits or 24 bits, and the long length CRC may have a length of 32 bits, 40 bits, or 48 bits.

Figure 1N:
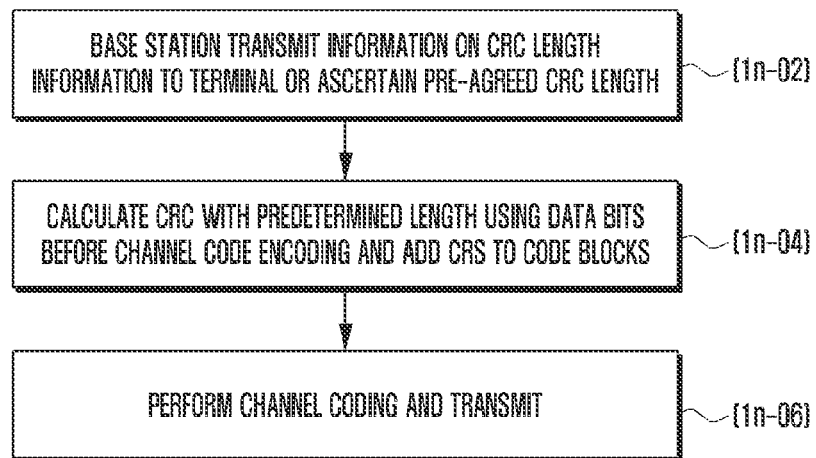
FIG. 1N is a flowchart of a transmitter according to embodiment 2 of the present invention.
Figure 10:
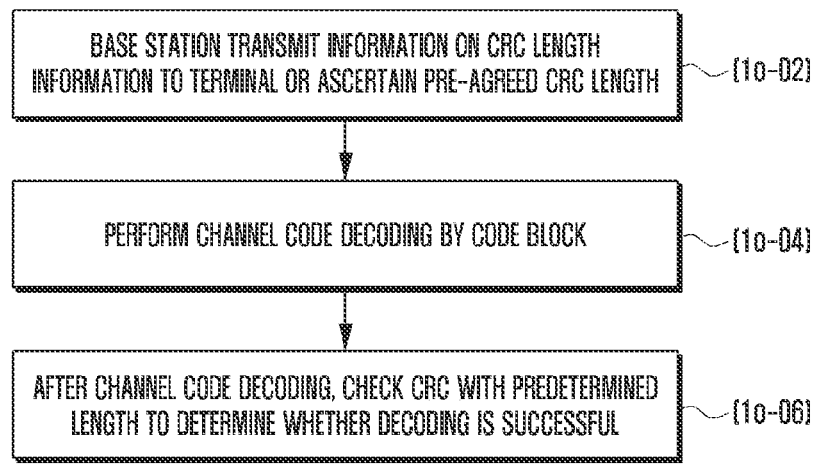

FIG. 1N is a flowchart illustrating a procedure for a transmitter to provide CRC length information and perform a transmission using a CRC with a predetermined CRC length. The CRC length information may be pre-agreed between the base station and the terminal or transmitted from the base station to the terminal at step 1n-02. The base station calculates the CRC with a predetermined length based on data bits and adds the CRC to the CB at step 1n-04. It may be possible to use a predetermined cyclic generator polynomial for calculating the CRC. The CRC-added CB may be encoded with a channel code at step 1n-06.

FIG. 1O is a flowchart illustrating a procedure for a receiver to determine whether signal reception is successful using a CRC with a predetermined length that is obtained from CRC length information. The CRC length information may be pre-agreed between the base station and the terminal or transmitted from the base station to the terminal at step 1o-02. The receiver performs channel code decoding by CB at step 1o-04. After channel code decoding, the receiver checks the CRC with the predetermined length to determine, at step 1o-06, whether the decoding is successful. The CRC test may be performed with the cyclic generator polynomial used by the transmitted for generating the CRC.

Embodiment 3

Embodiment 3 is directed to a method for determining a CRC length based on a service type of data being transmitted.

It may be possible for a base station and a terminal to assume that the CRC length varies depending on whether the service being provided is an eMBB service, a URLLC service, or an mMTC service. It may be pre-agreed that the length of a CRC being added to a CB is 24 bits for the eMBB service, 32 bits or 40 bits for the URLLC service, and 16 bits, 24 bits, or 32 bits for the mMTC service. This may be because the required HARQ-ACK reliability varies with service.

Embodiment 4

Embodiment 4 is directed to a method for a transmitter to perform retransmissions by sub-TB based on HARQ-ACK information that is generated by a receiver by sub-TB and transmitted to the transmitter, which is described with reference to FIGS. 1P and 1Q.

Figure 1P:
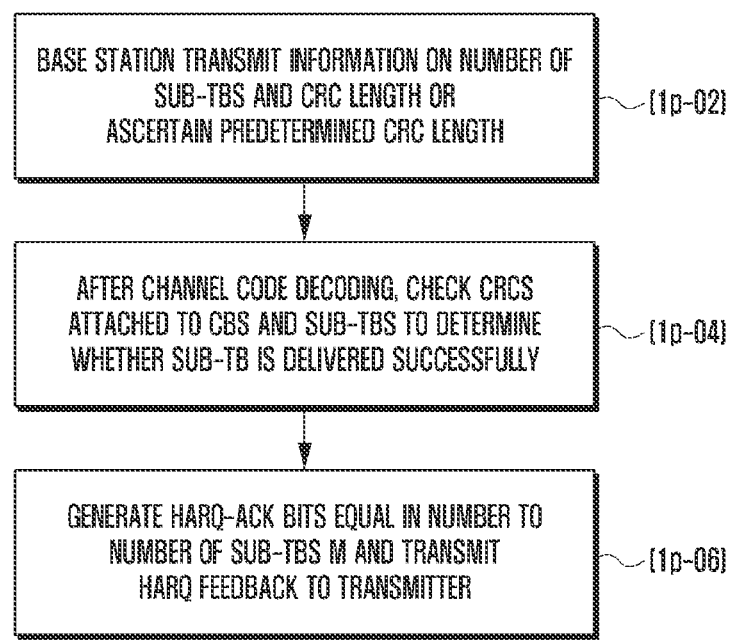
FIG. 1P is a flowchart illustrating a procedure of a receiver according to embodiment 4 of the present invention.

FIG. 1P is a flowchart illustrating a procedure for a receiver to transmit HARQ-ACK information by sub-TB. A base station and a terminal may share the information on a number of sub-TBs M and a CRC length at step 1p-02. The shared information may be transmitted from the base station to the UE via RRC signaling or DCI or shared according to a pre-agreed method. The receiver performs channel code decoding and checks the CRCs attached to CBs and sub-TBs to determine whether a specific sub-TB is successfully delivered at step 1p-04. At step 1p-06, the receiver transmits to the transmitter HARQ-ACK feedback information indicating whether the sub-TB is received successfully. The HARQ-ACK feedback information may include a number of bits corresponding to respective sub-TBs or bundles of sub-TBs. After transmitting the HARQ-ACK feedback information, the receiver may perform decoding on the sub-TBs that failed in the initial transmission under the assumption that the retransmission is performed by sub-TB.

Figure 1Q:
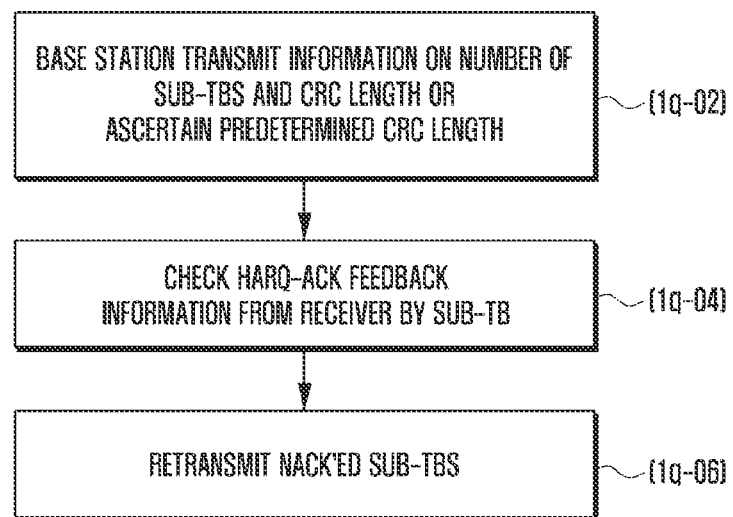
FIG. 1Q is a flowchart illustrating a procedure of a transmitter according to embodiment 4 of the present invention.

FIG. 1Q is a flowchart illustrating a procedure for a transmitter to perform retransmission by sub-TB based on HARQ-ACK information being transmitted by sub-TB. A base station and a terminal share the information on a number of sub-TBs M and a CRC length at step 1q-02. The shared information may be transmitted from the base station to the UE via RRC signaling or DCI or shared according to a pre-agreed method. The transmitter checks the HARQ-ACK feedback information transmitted by the receiver for transmission-failed sub-TBs at step 1q-04. The HARQ-ACK feedback information may include a number of bits corresponding to respective sub-TBs or bundles of sub-TBs. The transmitter retransmits the negatively acknowledged (NACK'ed) sub-TBs at step 1q-06.

Figure 1R:
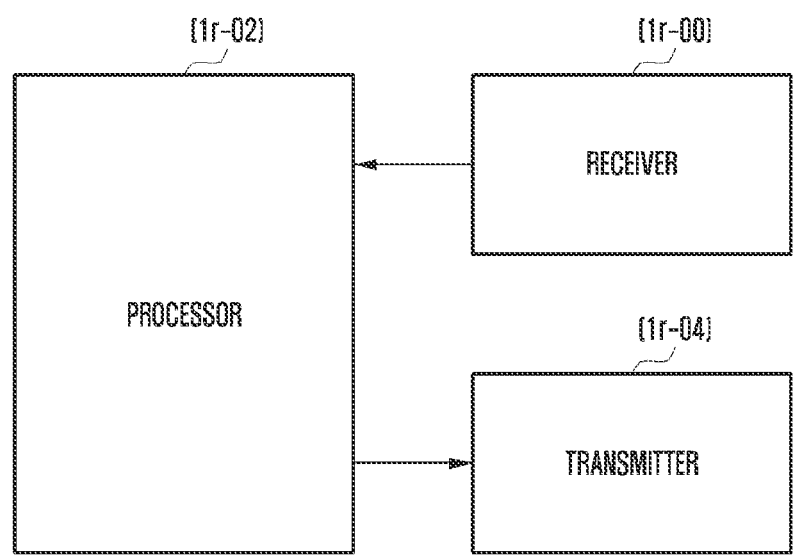
FIG. 1R is a block diagram illustrating a configuration of a UE according to an embodiment of the present invention.
Figure 1S:
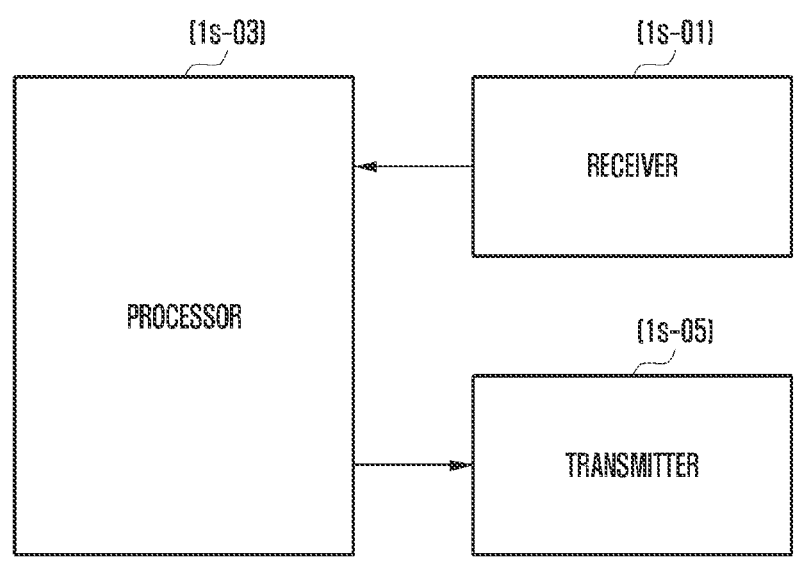
FIG. 1S is a block diagram illustrating a configuration of a base station according to an embodiment of the present invention.

The terminal and base station composed, each, of a transmitter, a receiver, and a processor for implementing the methods of the above embodiments are depicted in FIGS. 1R and 1S, respectively. In order to implement the method for determining a scheme for attaching CRCs by sub-TB, CB, and TB and communicating signals between the base station and the terminal based on the CRC attachment scheme in embodiments 1 to 4, the transmitter, receiver, and processor of each of the base station and the UE should operate as described in the respective embodiments.

FIG. 1R is a block diagram illustrating a configuration of a UE according to an embodiment of the present invention. As shown in FIG. 1R, the UE may include a processor 1r-02, a receiver 1r-00, and a transmitter 1r-04. According to an embodiment of the present invention, the receiver 1r-00 and the transmitter 1r-04 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output the signal received over a radio channel to the processor 1r-02 and transmit the signal output from the processor 1r-02 over the radio channel. According to an embodiment of the present invention, the processor 1r-02 may control overall operations of the UE. For example, the processor 1r-02 may control the receiver 1r-02 to receive a downlink data signal from a base station and determine whether the decoding succeeds by performing a CRC test by CB and sub-TB. Afterward, the transmitter 1r-04 may transmit HARQ-ACK feedback information by sub-TB.

FIG. 1S is a block diagram illustrating a configuration of a base station according to an embodiment of the present invention. As shown in FIG. 1S, the base station may include a processor 1s-03, a receiver 1s-01, and a transmitter 1s-05. According to an embodiment of the present invention, the receiver 1s-01 and the transmitter 1s-05 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 1s-03 and transmit the signal output from the processor 1s-03 over the radio channel. According to an embodiment of the present invention, the processor 1s-03 may control overall operations of the base station. For example, the processor 1s-03 may determine a number of sub-TBs M and control to generate and transmit corresponding information to a terminal. Afterward, the transmitter 1s-05 adds a CRC by CB and sub-TB and transmits the corresponding data, and the receiver 1s-01 receives HARQ-ACK information by sub-TB from the terminal.

According to an embodiment of the present invention, the processor 1s-03 may control to generate downlink control information (DCI) or a higher layer signaling signal including the number of sub-TBs and CRC length. In this case, the DCI or higher layer signaling signal may include information indicating whether the number of sub-TB and CRC length are included therein.

The embodiments disclosed in the specification and drawings are proposed to help explain and understand the present invention rather than to limit the scope of the present invention. It is obvious to those skilled in the art that modifications and changes can be made thereto without departing from the spirit and scope of the present invention. If necessary, the embodiments may be combined in whole or in part. For example the base station and the UE may operate according to a combination of parts of embodiments 1 to 4 of the present invention. Although the embodiments been directed to the FDD LTE system, the present invention can include alternative embodiments directed to other systems such as TDD LTE and 5G NR systems without departing from the technical sprit of the present invention.

What is claimed is:

1. A method performed by a terminal in a wireless communication system, the method comprising:
receiving, from a base station through a radio resource control (RRC) signaling, information on a number of code block groups per transport block (TB), wherein each code block group comprises at least one code block;
receiving, from the base station, a TB and control information scheduling the TB;

identifying code block groups for the TB, based on a number of code blocks (CBs) for the TB and the number of code block groups per TB, wherein the number of CBs for the TB is determined based on the control information, and wherein the number of code block groups per TB is determined based on the information;

generating hybrid automatic repeat request (HARQ) feedback information for the identified code block groups of the TB; and transmitting, to the base station, the generated HARQ feedback information.

2. The method of claim 1, wherein a size of HARQ feedback information bits is identical to the number of code block groups per TB.

3. The method of claim 2, wherein one bit of the HARQ feedback information bits corresponds to acknowledgement (ACK) or negative ACK (HACK) for one of the identified code block groups.

4. A method performed by a base station in a wireless communication system, the method comprising:
transmitting, to a terminal through a radio resource control (RRC) signaling, information on a number of code block groups per transport block (TB), wherein each code block group comprises at least one code block;
identifying code block groups for a TB, based on a number of code blocks (CBs) for the TB and the number of code block groups per TB;
transmitting, to the terminal, the identified code block groups for the TB and control information scheduling the TB; and
receiving, from the terminal, hybrid automatic repeat request (HARQ) feedback information for the identified code block groups of the TB.

5. The method of claim 4, wherein a size of HARQ feedback information bits is identical to the number of code block groups per TB.

6. The method of claim 5, wherein one bit of the HARQ feedback information bits corresponds to acknowledgement (ACK) or negative ACK (HACK) for one of the identified code block groups.

7. A terminal in a wireless communication system, the terminal comprising:
a transceiver; and
a controller configured to:
control the transceiver to receive, from a base station through a radio resource control (RRC) signaling, information on a number of code block groups per transport block (TB), wherein each code block group comprises at least one code block,
control the transceiver to receive, from the base station, a TB and control information scheduling the TB,
identify code block groups for the TB, based on a number of code blocks (CBs) for the TB and the number of code block groups per TB, wherein the number of CBs for the TB is determined based on the control information, and wherein the number of code block groups per TB is determined based on the information,
generate hybrid automatic repeat request (HARQ) feedback information for the identified code block groups of the TB, and
control the transceiver to transmit, to the base station, the generated HARQ feedback information.

8. The terminal of claim 7, wherein a size of HARQ feedback information bits is identical to the number of code block groups per TB.

9. The terminal of claim 8, wherein one bit of the HARQ feedback information bits corresponds to acknowledgement (ACK) or negative ACK (NACK) for one of the identified code block groups.

10. A base station in a wireless communication system, the base station comprising:
a transceiver; and
a controller configured to:
control the transceiver to transmit, to a terminal through a radio resource control (RRC) signaling, information on a number of code block groups per transport block (TB), wherein each code block group comprises at least one code block,
identify code block groups for a TB based on a number of code blocks (CBs) for the TB and the number of code block groups per TB,
control the transceiver to transmit, to the terminal, the identified code block groups for the TB and control information scheduling the TB, and
control the transceiver to receive, from the terminal, hybrid automatic repeat request (HARQ) feedback information for the identified code block groups of the TB.

11. The base station of claim 10, wherein a size of HARQ feedback information bits is identical to the number of code block groups per TB.

12. The base station of claim 11, wherein one bit of the HARQ feedback information bits corresponds to acknowledgement (ACK) or negative ACK (NACK) for one of the identified code block groups.

* * * * *

UNITED STATES PATENT AND TRADEMARK OFFICE
CERTIFICATE OF CORRECTION

| | | |
|---|---|---|
| PATENT NO. | : 11,777,649 B2 | Page 1 of 1 |
| APPLICATION NO. | : 17/409382 | |
| DATED | : October 3, 2023 | |
| INVENTOR(S) | : Jeongho Yeo et al. | |

It is certified that error appears in the above-identified patent and that said Letters Patent is hereby corrected as shown below:

In the Claims

In Column 23, Line 18, in Claim 3:
"(ACK) or negative ACK (HACK) for one of the identified"
Should be:
--(ACK) or negative ACK (NACK) for one of the identified--

In Column 23, Line 40, in Claim 6:
"(ACK) or negative ACK (HACK) for one of the identified"
Should be:
--(ACK) or negative ACK (NACK) for one of the identified--

Signed and Sealed this
Eleventh Day of February, 2025

Coke Morgan Stewart
*Acting Director of the United States Patent and Trademark Office*